(12) United States Patent
Hayes et al.

(10) Patent No.: US 6,481,457 B2
(45) Date of Patent: Nov. 19, 2002

(54) SAFETY RESTRAINT ASSEMBLY FOR HIGH PRESSURE FLOW LINE

(75) Inventors: Glenn P. Hayes, Hurst, TX (US); Mark D. Matzner, Burleson, TX (US); Timothy Andrew Gauss, Kingwood, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 187 days.

(21) Appl. No.: 09/754,693

(22) Filed: Jan. 3, 2001

(65) Prior Publication Data

US 2002/0083978 A1 Jul. 4, 2002

(51) Int. Cl.[7] .............................. F16L 13/04; F16L 35/00
(52) U.S. Cl. ..................... 137/377; 285/117; 24/115 K; 24/122.6; 24/135 R; 24/335
(58) Field of Search .......................... 24/115 K, 122.6, 24/135 R, 335; 137/377, 343; 285/117

(56) References Cited

U.S. PATENT DOCUMENTS

| | | | |
|---|---|---|---|
| 3,813,733 A | 6/1974 | Flohr | 285/81 |
| 3,859,692 A | 1/1975 | Waterman et al. | 285/117 |
| 4,549,332 A | 10/1985 | Pouliot | 285/117 |
| 5,507,533 A | * 4/1996 | Mumma | 285/114 |
| 5,689,862 A | * 11/1997 | Hayes et al. | 24/284 |

OTHER PUBLICATIONS

WPI Abstract 2000–234007, 2000.

JP 2000055265 Bridgestone Flow Tech 2000.

* cited by examiner

Primary Examiner—A. Michael Chambers
(74) Attorney, Agent, or Firm—Bracewell & Patterson, L.L.P.

(57) ABSTRACT

A high pressure flow line that is formed from sections of pipe that are coupled together is provided with a safety restraint assembly. The safety restraint assembly is formed by wrapping short, flexible rib tethers around the pipeline near the ends of each section of pipe. A plurality of long tethers are linked end-to-end to form a continuous spine, which is threaded through all of the rib tethers. Each of the tethers contains continuous filaments. The spine is then anchored at each of its terminal ends to suitable anchoring structures. Alternatively, the safety restraint assembly may utilize anchor elements in addition to the tethers.

25 Claims, 3 Drawing Sheets

SAFETY RESTRAINT ASSEMBLY FOR HIGH PRESSURE FLOW LINE

TECHNICAL FIELD

This invention relates to safety equipment, and in particular to a safety device for a high pressure flow line.

BACKGROUND OF THE INVENTION

In oil and gas wells, it is often necessary to stimulate the well in order to increase its production. One method is to fracture the producing formation by introducing fluids into the well under extremely high pressure. The high pressure fluids damage the formation by creating cracks or fissures, causing the oil or gas to flow more freely from the formation. This allows more oil and gas to be produced from the well.

The flow lines used for these operations must be able to withstand the high pressures of the fracturing fluids that are introduced into the well. The flow lines are usually only temporarily connected to the wellhead for the duration of the fracturing operation. Even though the flow lines may be designed to withstand high pressures, ruptures in the pipe and coupling failures may still occur. Because of the danger associated with pumping these high pressure fluids, safety precautions must be taken to minimize the hazards created when failures do occur. Breaks in the pipeline used for conducting the pressurized fluids to the wellhead can result in the uncontrolled flailing or whipping of the pipe as the high pressure fluid escapes, particularly if the fluid is gaseous. This creates an extreme hazard to any surrounding persons, equipment or structures.

In the prior art, U.S. Pat. No. 5,689,862 discloses an apparatus and method for anchoring the pipeline which involves positioning pipe clamps near the ends of each pipe section. The clamps are provided with a bore through which a steel cable is threaded. In this way a series of clamps can be anchored with only a single length of cable. The cable is then secured at the ends to a suitable anchoring structure. While the cable is a suitable anchoring method, improvements are desired.

SUMMARY OF THE INVENTION

A high pressure flow line that is formed from sections of pipe that are coupled together is provided with a safety restraint assembly. The safety restraint assembly is formed by wrapping short, flexible rib tethers around the pipeline near the ends of each section of pipe. A plurality of long tethers are linked end-to-end to form a continuous spine, which is threaded through all of the rib tethers. Each of the tethers contains continuous filaments. The spine is then anchored at each of its terminal ends to suitable anchoring structures. Alternatively, the safety restraint assembly may utilize anchor assemblies in addition to the tethers.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications of embodiments that fall within the true scope of the invention.

Figure 1:
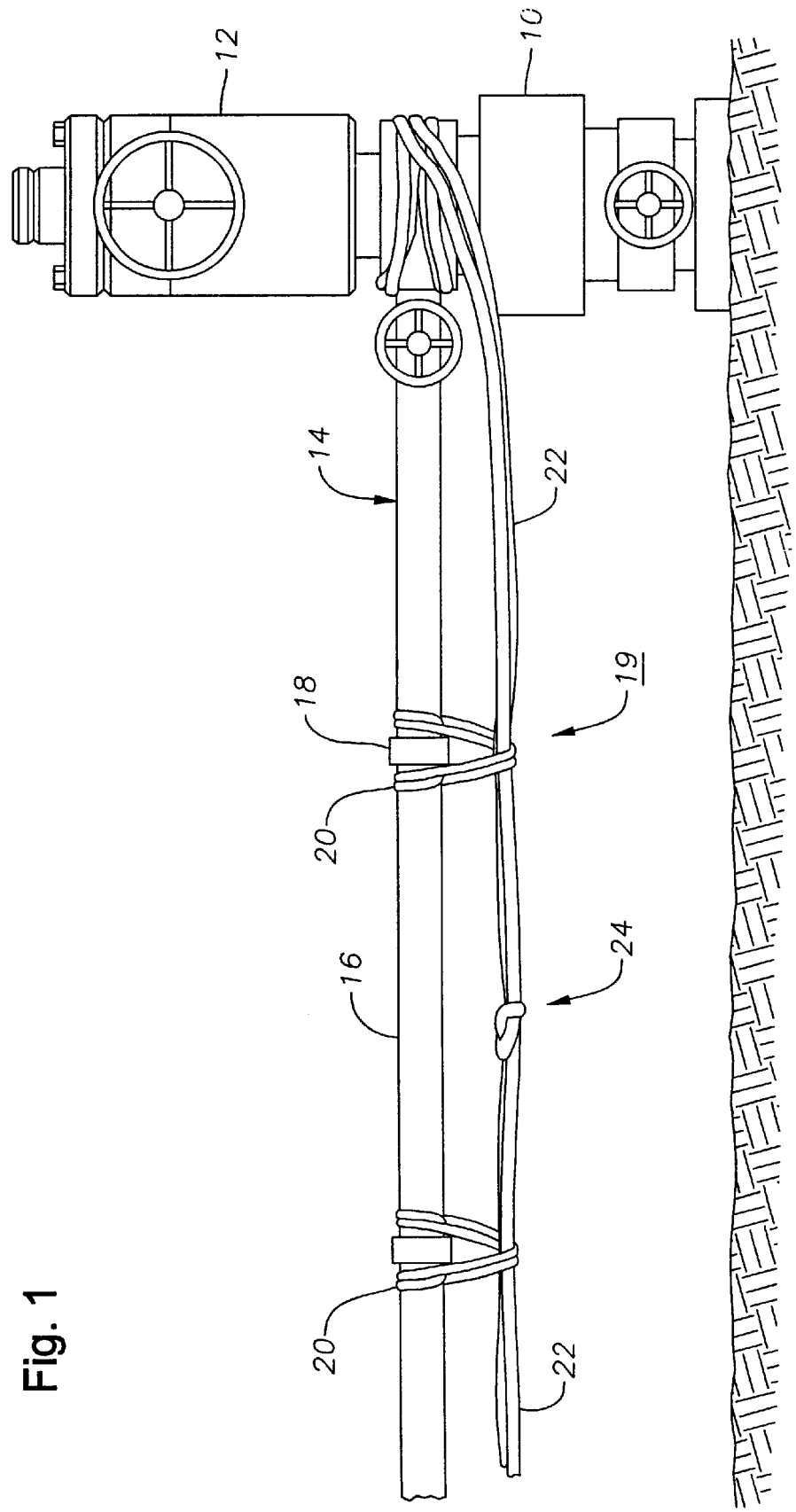
FIG. 1 is a side view of a first embodiment of a safety restraint assembly constructed in accordance with the present invention and shown installed on a high pressure flow line connected to a wellhead of an oil and gas well.

Referring to FIG. 1, an oil and/or gas well is designated generally by the reference numeral 10. The well 10 is provided with a Christmas tree 12 where fluids may be delivered to and from the well. A temporary high pressure flow line 14 is coupled to and in fluid communication with the tree 12 for supplying high pressure fluids to the well 10 during fracturing operations. The flow line 14 is formed from a plurality of pipe or tubing sections 16 that are joined together at their abutted ends by collars or unions 18.

Flow line 14 is provided with a first embodiment of a safety restraint assembly 19 that is constructed in accordance with the present invention. Safety restraint assembly 19 comprises a plurality of short, relatively small diameter radial or rib tethers 20 that are wrapped around each pipe section 16. Preferably, one rib tether 20 straddles or spans each collar 18 (FIG. 3) at the ends of abutted pipe sections 16. Rib tethers 20 are spaced apart from each other along an axial length of flow line 14. At least one relatively large diameter, axial or long tether 22 extends through rib tethers 20. When a plurality of long tethers 22 are required, the long tethers 22 are linked end-to-end in a chain-like configuration as shown (FIG. 9) to form an extended spine 24. Each tether 20, 22 is a flexible continuous loop. Spine 24 is threaded through all rib tethers 20 and secured at its two terminal ends to a suitable anchoring structure, such as well 10 and tree 12.

Figure 2:
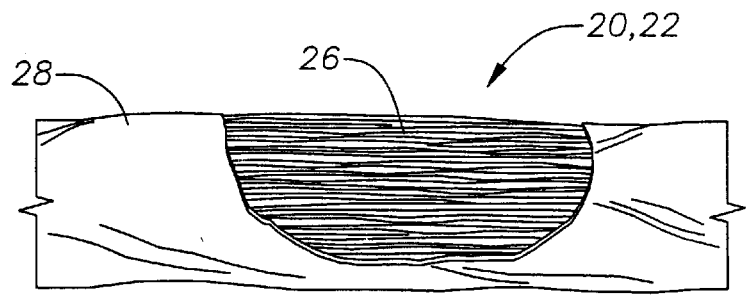
FIG. 2 is an enlarged view of a tether of the safety device of FIG. 1, shown with an outer portion thereof partially cutaway.

Referring now to FIG. 2, one embodiment of a typical rib tether 20 or long tether 22 is shown. Tether 20, 22 comprises a plurality of flexible polyester yarns or filaments 26 with a sleeve or outer covering 28 formed from a double layer of flexible polyester or nylon woven fabric. In the preferred embodiment, Tuflex Roundslings® manufactured by Lift-All of Houston, Tex., are utilized. More specifically, the preferred embodiment utilizes Roundsling® style EN180 for rib tethers 22, and Roundsling® style EN 360 for long tethers 22 of spine 24. Other types of tethers also may be utilized.

Figure 3:
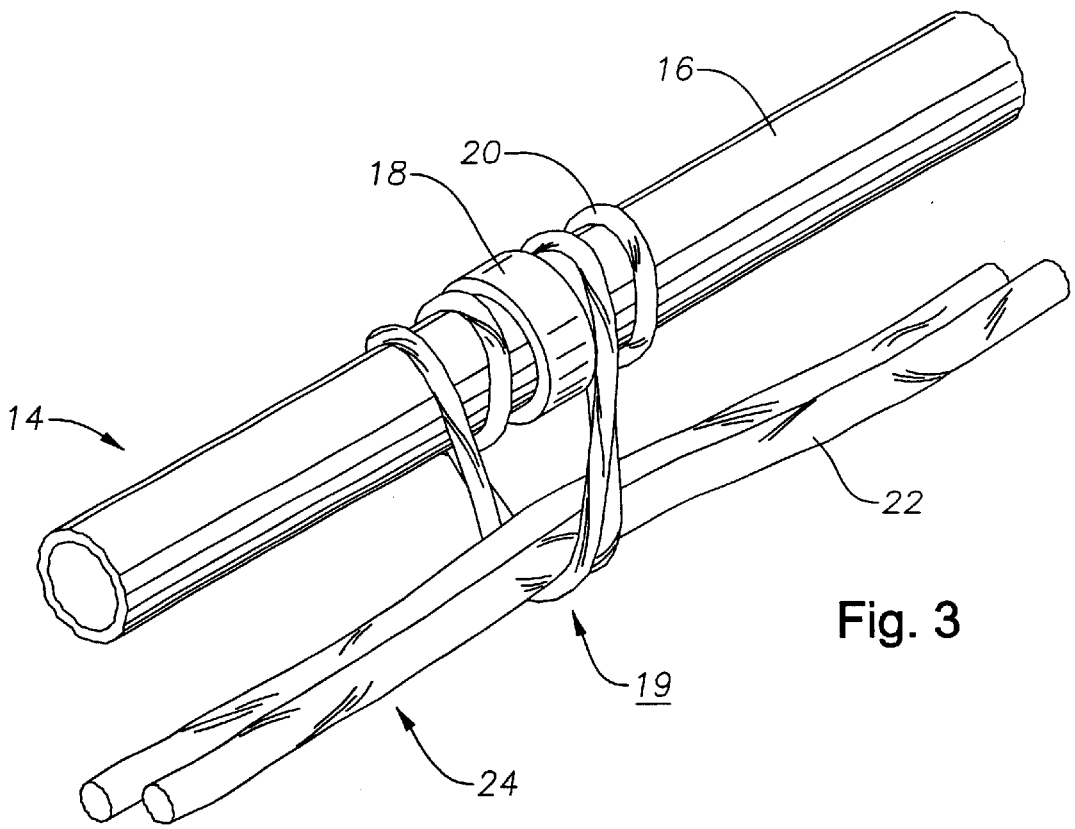
FIG. 3 is a schematic, isometric drawing of a portion of the safety device of FIG. 1, shown installed on a component of the flow line of FIG. 1.

As shown in FIG. 3, each rib tether 20 is wrapped around the flow line 14 in a "dual basket" configuration. This wrapping method forms a loop through which the spine 24 may be threaded. Each of the long tethers 22 that form spine 24 are interconnected at their ends (see FIG. 1) to form a continuous chain. One end of the spine 24 is anchored to the pumping equipment (not shown) and the other end is anchored to wellhead 10. Various methods may be employed to secure spine 24 to wellhead 10, including tying, wrapping, shackles and the like. However, the individual tethers 20, 22 are not severed or cut. In case flow line 14 ruptures or breaks during the fracturing operation, the anchored spine 24 will prevent the uncontrolled flailing or movement of the pipe 16 as the high pressure fluid escapes from flow line 14.

In operation, safety restraint assembly 19 is designed to be installed after the flow line 14 is complete, but may be done before so. The spine 24 is formed by looping together a plurality of long tethers 22 end-to-end to form a continuous chain that is long enough to span the entire length of flow line 14 from the pumping equipment to wellhead 10. Rib tethers 20 are wrapped in a dual basket configuration around each pipe section 16, and straddle collars 18. The spine 24 is threaded through the loops of each rib tether 20 along the flow line 14. Finally, both ends of the spine 24 are anchored to suitable anchoring structures, such that spine 24 forms a continuous restraint assembly between the suitable anchoring structures.

Figure 4:
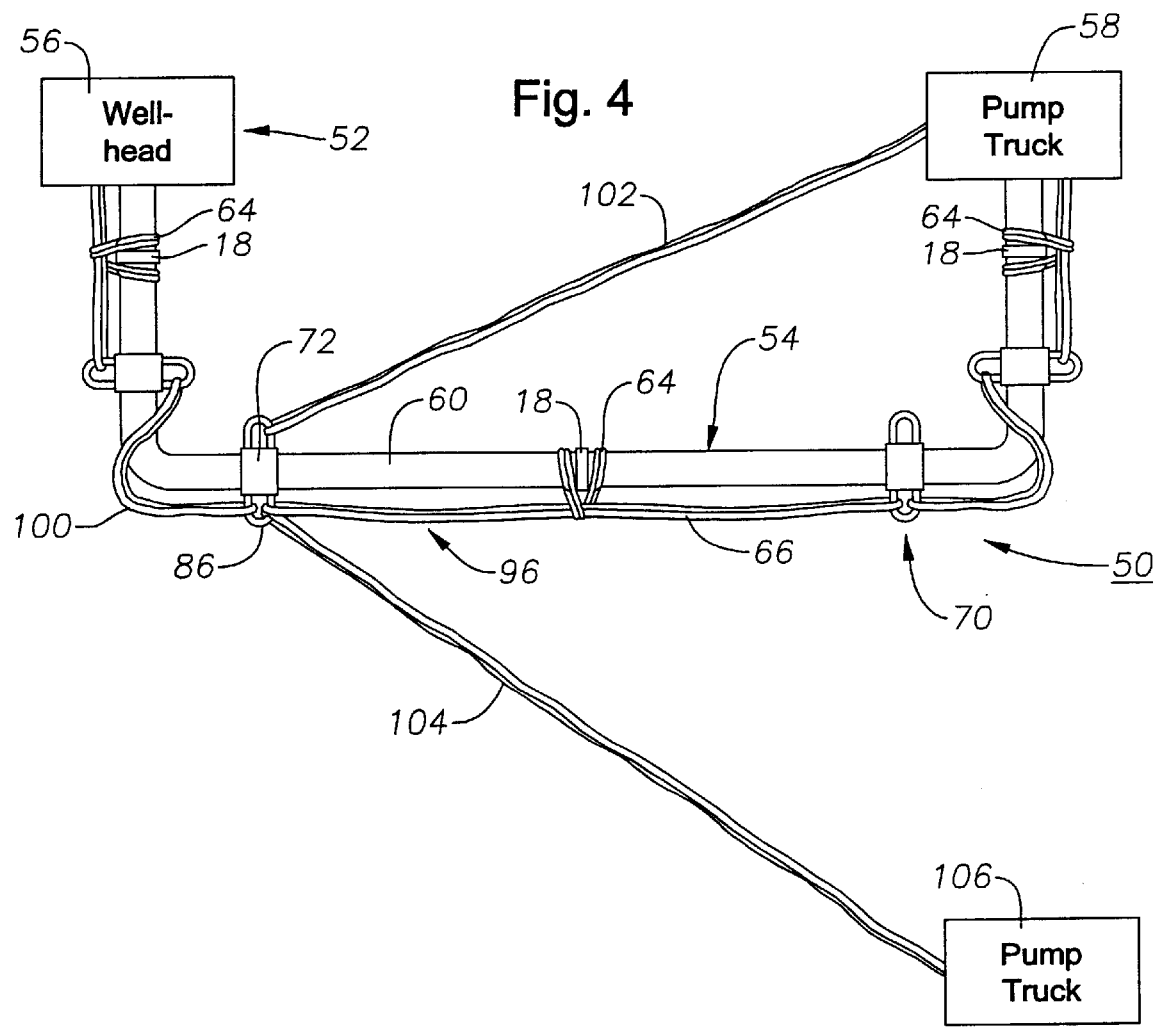
FIG. 4 is a schematic side view of a second embodiment of a safety restraint assembly constructed in accordance with the present invention and shown installed on a high pressure flow line extending between a wellhead and a pump truck.

Referring now to FIG. 4, a second embodiment of a safety restraint assembly 50 that is constructed in accordance with the present invention is shown. Like safety restraint assembly 19, safety restraint assembly 50 is attached to a well 52 having a high pressure flow line 54 that extends between a wellhead 56 and a primary pump truck 58 for fracturing operations. Flow line 54 is made up sections of pipe 60 that are joined by collars.

Also like safety restraint assembly 19, safety restraint assembly 50 uses the short, smaller diameter rib tethers 64 to wrap around the collars and pipe sections 60, and long, larger diameter tethers 66, 100. Although only a few rib tethers 64 are shown, larger or longer applications will require many more rib tethers 64. Rib tethers 64 are the same as tethers 20, and tethers 66, 100 are the same as tethers 22, and are generally interconnected in the same manner as described above. Ideally, tethers 100 extend along shorter axial lengths of flow line 54 between axially adjacent ones of the shackles 86 as shown. Although tethers 100 are shown in a somewhat slack condition for ease of illustration, it is preferable to install tethers 100 in a tight or taught condition. In contrast to assembly 19, assembly 50 also utilizes metallic anchor assemblies 70 that are mounted directly in-line with pipe sections 60. Thus, anchor assemblies 70 have hollow thru-bores that permit passage of the high pressure fluid in flow line 54 to pass therethrough. Each end of tether 66 is secured to a different anchor assembly 70 as shown. The last tether 66 on each terminal end of safety restraint assembly 50 is anchored to a suitable anchoring structure, such as wellhead 56 and primary pump truck 58.

Figure 6:
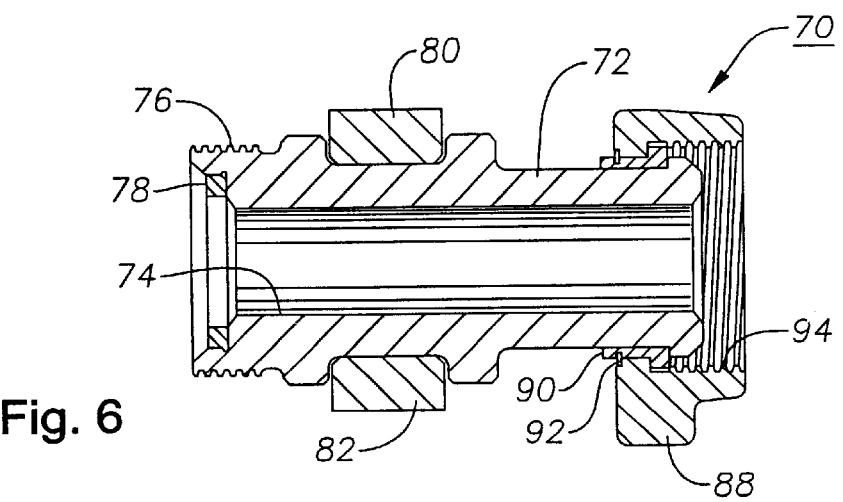
FIG. 6 is a sectional side view of the anchor assembly of FIG. 5 taken along the line 6—6 of FIG. 5.
Figure 5:
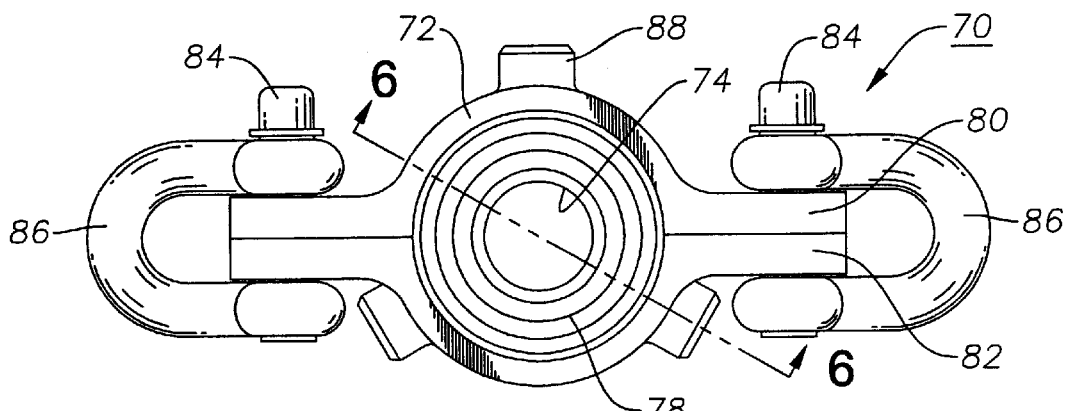
FIG. 5 is an end view of an anchor assembly utilized by the safety restraint assembly of FIG. 4.

Referring now to FIGS. 5 and 6, each anchor assembly 70 comprises a generally tubular crossover or base 72 having a smooth cylindrical bore 74. In the preferred embodiment the diameter of bore 74 is substantially identical to the inner diameter of pipe sections 60. As shown in FIG. 6, the left end of base 72 has external male threads 76 and contains a seal ring 78 that is mounted adjacent to the left side of bore 74. Seal ring 78 has an inner diameter that is slightly larger than the diameter of bore 74. A swivel clamp comprising two mirror-imaged halves 80, 82 is rotatably mounted to the exterior of base 72 between a pair of bosses. Collectively, the halves 80, 82 of the clamp form a pair of opposed flanges that extend radially from base 72. Each flange has a hole through which a bolt 84 extends to secure a generally C-shaped shackle 86.

As shown in FIG. 5, a wing nut 88 is rotatably mounted to the right end of base 72 via retainer segments 90 and a retainer ring 92, which allow wing nut 88 to rotate relative to base 72. Wing nut 88 contains female threads 94. Threads 76 and wing nut 88 are interconnectable with unions and the threaded ends of pipes 60, respectively. Since the ends of long tethers 66, 100 are secured to shackles 86 of anchor assemblies 70 (FIG. 4), tethers 66, 100 and anchor assemblies 70 collectively form a continuous spine 96 between wellhead 56 and pump truck 58. Spline 96 is allowed at least some rotational freedom via shackles 86 on the swivel clamps. In case flow line 54 ruptures or breaks during the fracturing operation, the anchored spine 96 will prevent the uncontrolled flailing or movement of pipes 60 as the high pressure fluid escapes from flow line 54.

In operation, safety restraint assembly 50 is designed to be installed in-line with flow line 54. The spine 96 is formed by looping together a plurality of long tethers 66, anchor assemblies 70, and additional safety restraints or tethers 64, 100 (such as those previously described) to form a continuous chain that is long enough to span the entire length of flow line 54 from primary pump truck 58 to wellhead 56. Rib tethers 64 are wrapped in the dual basket configuration around each pipe 60. Long tethers 66 are threaded through the loops of each rib tether 64 along the flow line 54. Both ends of spine 96 are anchored to suitable anchoring structures such as wellhead 52 and pump truck 58. In addition, optional anchor lines 102, 104, comprising materials similar to those described above, are used to further restrain flow line 54 in the event of an explosion. For example, as shown in FIG. 4, anchor line 102 is secured between one anchor assembly 70 and primary pump truck 58, while anchor line 104 is secured between another anchor assembly 70 and a secondary pump truck or other suitable anchor 106. Other combinations of anchor lines between various components of flow line 54 and suitable anchoring structures also may be used.

The safety restraint assemblies of the present invention has several advantages. The rib and spine tether system is easily installed and readily adaptable to many different applications. The tethers are strong and durable, with good water and UV resistance. These safety devices provide excellent, inexpensive ways to add safety to field piping systems. Tests have shown that the safety devices will effectively contain pipe movement even if gas pressure ruptures the flow line.

While the invention has been shown and described in only one of its forms, it should be apparent to those skilled in the art that it is not so limited but is susceptible to various changes without departing from the scope of the invention.

We claim:

1. A safety device for a high pressure flow line formed from sections of pipe that are coupled together to define an axial length, the safety device comprising:

a plurality of rib tethers adapted to be wrapped around the flow line and along the axial length of the flow line; and an axial tether threaded through each of the rib tethers and adapted to extend along the axial length of the flow line to form a spine, wherein each terminal end of the spine is adapted to be anchored to an anchoring structure, such that the spine forms a continuous restraint assembly between said anchoring structures.

2. The safety device of claim 1 wherein each of the rib tethers and the axial tether is a flexible continuous filament loop.

3. The safety device of claim 1 wherein each of the rib tethers and the axial tether is formed from polyester filaments within a woven fabric sleeve.

4. The safety device of claim 1 wherein each of the rib tethers and the axial tether is formed from a plurality of flexible polyester filaments covered by a double layer of woven fabric selected from the group consisting of polyester and nylon.

5. The safety device of claim 1 wherein the rib tethers are adapted to straddle ends of the pipe sections.

6. The safety device of claim 1 wherein the rib tethers are adapted to be wrapped around the flow line in a dual basket configuration.

7. The safety device of claim 1 wherein the spine comprises a plurality of axial tethers.

8. The safety device of claim 7 wherein the plurality of axial tethers are interconnected end-to-end in a chain-like configuration to form the spine.

9. The safety device of claim 7, further comprising an anchor element adapted to be mounted to the flow line.

10. A safety device for a high pressure flow line formed from sections of pipe that are coupled together to define an axial length, the safety device comprising:

a plurality of radial tethers adapted to be wrapped around the flow line and spaced apart from each other along the axial length of the flow line; and a plurality of axial tethers linked end-to-end in a chain-like configuration to form a spine that is threaded through each of the radial tethers and adapted to extend along the axial length of the flow line, wherein each terminal end of the spine is adapted to be anchored to an anchoring structure, such that the spine and the radial tethers form a continuous restraint assembly between said anchoring structures.

11. The safety device of claim 10 wherein each of the radial and axial tethers is a flexible continuous filament loop.

12. The safety device of claim 10 wherein each of the radial and axial tethers is formed from polyester filaments within a woven fabric sleeve.

13. The safety device of claim 10 wherein each of the radial and axial tethers is formed from a plurality of flexible polyester filaments covered by a double layer of woven fabric selected from the group consisting of polyester and nylon.

14. The safety device of claim 10 wherein the radial tethers are adapted to straddle ends of the pipe sections.

15. The safety device of claim 10 wherein the radial tethers are adapted to be wrapped around the flow line in a dual basket configuration.

16. A safety device for a high pressure flow line formed from sections of pipe that are coupled together to define an axial length, the safety device comprising:

a plurality of radial tethers adapted to be wrapped around the flow line and spaced apart from each other along the axial length of the flow line;

a plurality of axial tethers, each having axial ends threaded through at least one of the radial tethers;

a plurality of anchor elements adapted to be mounted in-line with the flow line; wherein the axial tethers and anchor elements are interconnected and adapted to extend along the axial length of the flow line to define a spine, and wherein each terminal end of the spine is adapted to be anchored to an anchoring structure, such that the spine and the radial tethers form a continuous restraint assembly between said anchoring structures.

17. The safety device of claim 16 wherein each of the radial and axial tethers is a flexible continuous filament loop.

18. The safety device of claim 16 wherein each of the radial and axial tethers is formed from polyester filaments within a woven fabric sleeve.

19. The safety device of claim 16 wherein each of the radial and axial tethers is formed from a plurality of flexible polyester filaments covered by a double layer of woven fabric selected from the group consisting of polyester and nylon.

20. The safety device of claim 16, further comprising at least one anchor line extending from one of said anchor elements to an anchoring structure.

21. The safety device of claim 16 wherein the radial tethers are adapted to be wrapped around the flow line in a dual basket configuration.

22. The safety device of claim 16 wherein adjacent ones of the anchor elements are interconnected with additional tethers extending in a generally axial direction.

23. The safety device of claim 16 wherein each of the anchor elements comprises a shackle to which the axial end of one of the axial tethers is joined.

24. The safety device of claim 16 wherein each of the anchor elements has a rotatable wing nut on one axial end, threads on an opposite axial end, and a clamp secured therebetween for supporting the shackle.

25. The safety device of claim 24 wherein the clamp comprises two mirror-image halves that form a pair of opposed flanges that extend radially from the anchor element, each flange having a hole through which a bolt extends to secure the shackle, such that each anchor element has two shackles.

* * * * *